United States Patent [19]

Jordan et al.

[11] E Re. 29,996

[45] Reissued May 15, 1979

[54] UPFLOW FILTER

[75] Inventors: Edward J. Jordan, Willoughby, Ohio; John R. Snyder, Fort Wayne, Ind.

[73] Assignee: Jet Aeration Company, Cleveland, Ohio

[21] Appl. No.: 838,748

[22] Filed: Oct. 3, 1977

Related U.S. Patent Documents

Reissue of:

[64] Patent No.: 3,950,252
Issued: Apr. 13, 1976
Appl. No.: 558,820
Filed: Mar. 17, 1975

U.S. Applications:

[63] Continuation-in-part of Ser. No. 449,735, Mar. 11, 1974, abandoned.

[51] Int. Cl.[2] ..... B01D 23/16; B01D 23/18

[52] U.S. Cl. ..... 210/281; 405/36; 210/170; 210/284; 210/286; 210/293; 210/311

[58] Field of Search ..... 61/11, 13; 210/80, 153, 210/170, 264, 266, 275, 281, 284, 285-286, 291, 293, 311

[56] References Cited

U.S. PATENT DOCUMENTS

| | | | |
|---|---|---|---|
| 964,694 | 7/1910 | Richert | 210/264 |
| 1,465,968 | 8/1923 | Cap | 210/286 X |
| 2,760,643 | 8/1956 | Schaaf | 210/293 X |
| 2,785,123 | 3/1957 | Stroud | 210/80 X |
| 3,134,735 | 5/1964 | Greenleaf, Jr. | 210/264 X |
| 3,642,134 | 2/1972 | Reckers | 210/80 X |
| 3,771,655 | 11/1973 | Hudson, Jr. | 210/264 X |

FOREIGN PATENT DOCUMENTS

| | | | |
|---|---|---|---|
| 311895 | 3/1915 | Fed. Rep. of Germany | 210/264 |

*Primary Examiner*—Charles N. Hart
*Assistant Examiner*—Ethel R. Cross
*Attorney, Agent, or Firm*—Woodling, Krost, Granger & Rust

[57] ABSTRACT

An upflow filter adapted to be used with a home sewage treatment plant which includes a container which has a wall extending thereacross to divide the container into first and second filtering chambers. First and second gratings are located in the first and second chambers respectively and serve to divide each filtering chamber into top and bottom portions and each grating has filtering media covering the same. The container has an inlet and an outlet with the outlet located at a lower level from the inlet. [First liquid conduit means are connected to the wall and provides for fluid communication from the inlet to the bottom portions of each of the first and second filtering chambers. Second liquid] *A vertical opening is cast into the dividing wall and has lateral exit portions that communicate with the bottom portions of the first and second filtering chambers. The liquid inlet communicates with this vertical opening. Liquid* conduit means are connected to the wall and provides for fluid communication from the top portion of each of the first and second filtering chambers to the outlet. A variation of the invention involves the providing of a cut out in the dividing wall so that filtered material will exit both filtering chambers in the event the filter is not set or installed perfectly level. The foregoing abstract is merely a resume of one general application and is not a complete discussion of all principles of operation or applications and is not to be construed as a limitation on the scope of the claimed subject matter.

9 Claims, 9 Drawing Figures

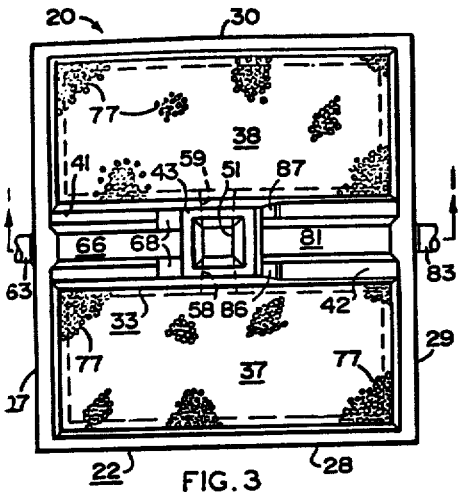
FIG. 3
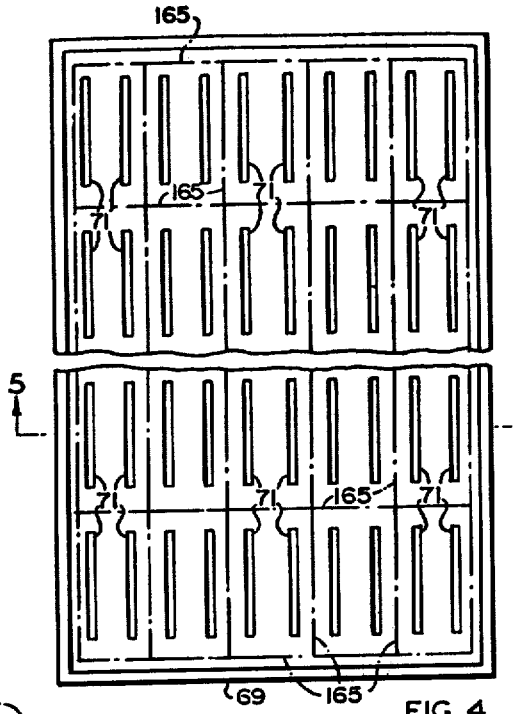
FIG. 4
FIG. 5
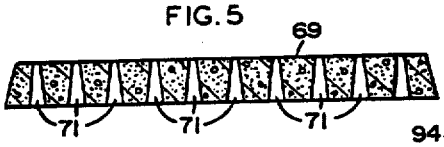
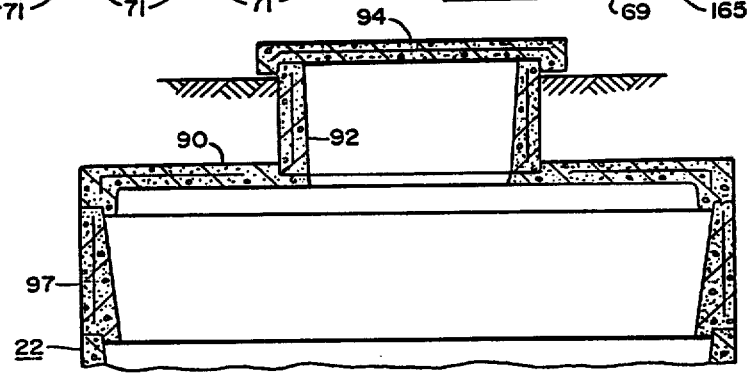
FIG. 6
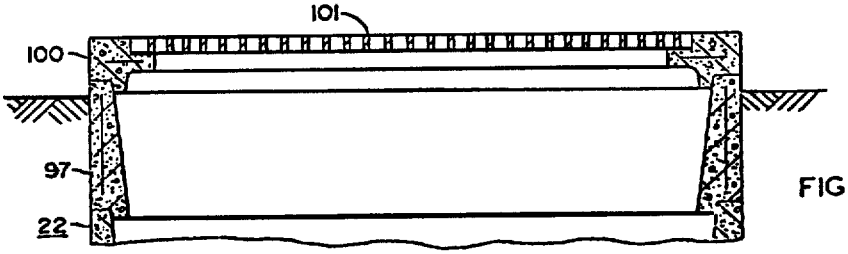
FIG. 7

FIG. 8
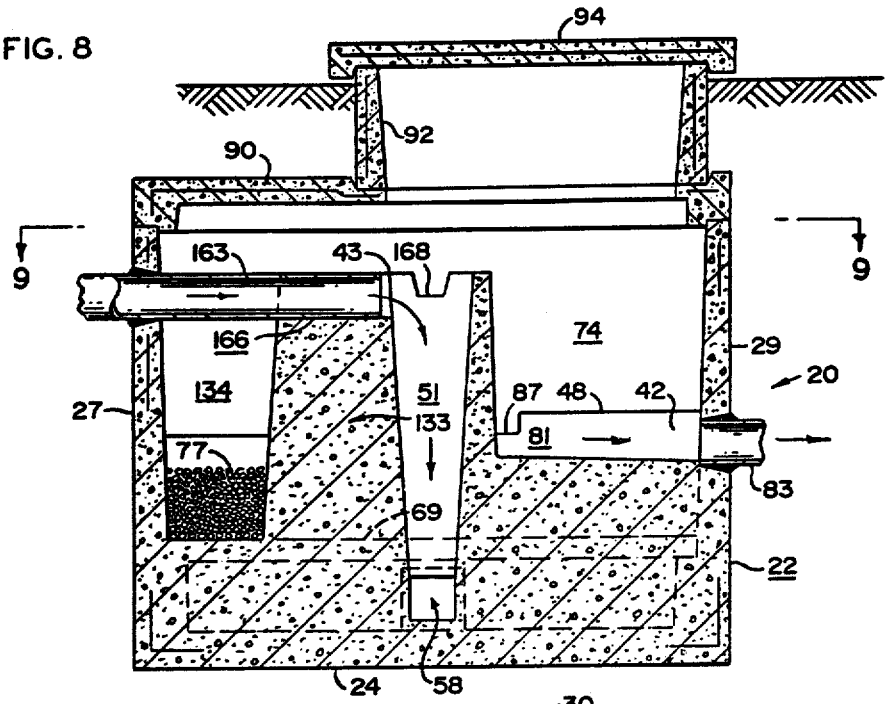
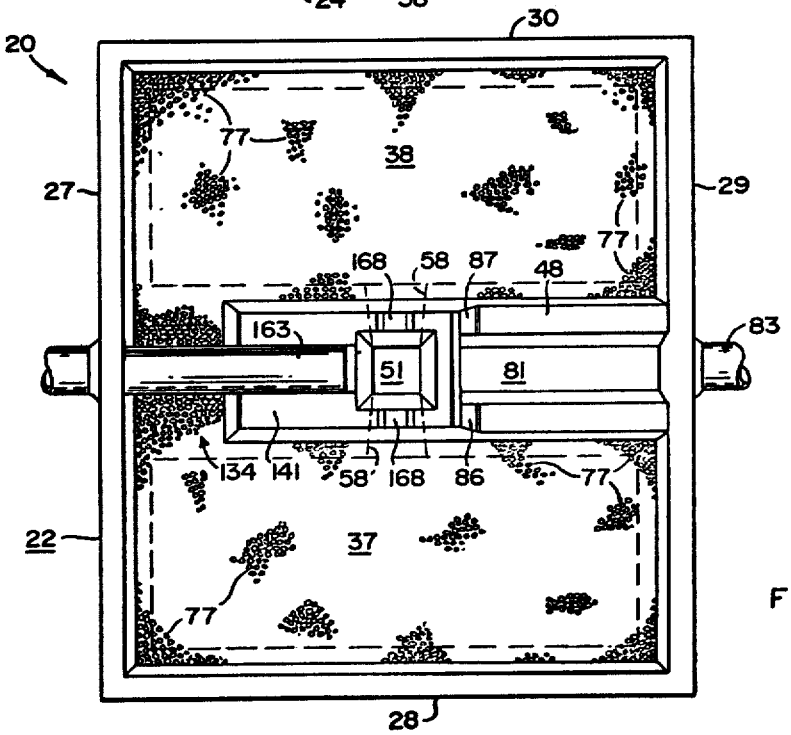
FIG. 9

UPFLOW FILTER

Matter enclosed in heavy brackets [ ] appears in the original patent but forms no part of this reissue specification; matter printed in italics indicates the additions made by reissue.

This patent application is a continuation-in-part of U.S. patent application Ser. No. 449,735 filed Mar. 11, 1974, now abandoned, and entitled "Upflow Filter".

The filter of the present invention has been designed particularly for use with a sewage treatment system used by the home owner where city sewage treatment systems are not available. The filter, while susceptible of many other uses, is used with a home system which utilizes an aerobic bacteria system of sewage disposal, as distinguished from an anerobic system which generates methane as one of the by-products.

In present home aerobic systems the effluent from the plant has been filtered through so-called sand filters and through leach fields (or combination of the two); however, these systems do not provide the complete clarification of the plant effluent which is desired by many governmental agencies.

The filter of the present invention reduces the suspended solids and BOD in the effluent from the home plant where the aerobic bacterial decomposition of the sewage takes place. This home plant may be of many configurations and one example would be a tank having a first compartment which receives the household sewage where solid material settles to the bottom and at this point anerobic bacteria act on the solids to break them down. This pre-treated sewage then passes to a second compartment where it is saturated with oxygen to support the aerobic bacterial digestion process. The treated sewage next passes to a third compartment which functions as a settling compartment where solids settle to the bottom and return to the second compartment and purified liquid on the top of the third compartment exits through a discharge line.

The present filter is quite advantageous in that it has no moving mechanical parts, solids separated by the filter can be conveniently returned to the home plant and the filtering media, which never need by replaced, can be easily backwashed with water to clean the same.

Other objects and a fuller understanding of this invention may be had by referring to the following description and claims, taken in conjunction with the accompanying drawings, in which:

FIG. 3 is a plan view of the filter of the present invention and taken generally along the line 3—3 of FIG. 1;

FIG. 4 is a plan view of the concrete grating seen in FIG. 2;

FIG. 5 is a view taken generally along the line 5—5 of FIG. 4;

FIG. 6 is a fragmentary view similar to FIG. 1 but showing a modification of bringing the top edge of the filter up to grade;

FIG. 7 is a view similar to FIG. 6 and showing another variation of bringing the top of the filter up to grade;

FIG. 8 is a side elevational view in section, similar to FIG. 1, showing a modification of the invention; and FIG. 9 is a view taken generally along the line 9—9 of FIG. 8.

Figure 1:
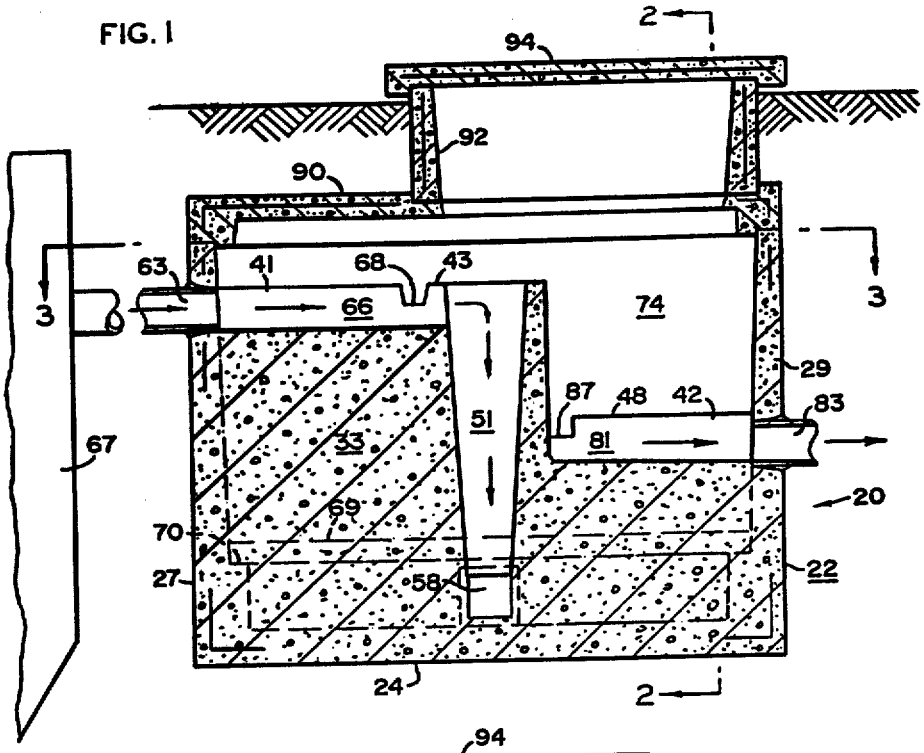
FIG. 1 is a side elevational view in section of the filter of the present invention and taken generally along the line 1—1 of FIG. 3.

The upflow filter of the present invention has been indicated generally in the drawings by the reference numeral 20 and includes in combination a generally rectangularly-shaped reinforced cast concrete container 22 which has an open top, a bottom wall 24 and four sidewalls identified by the reference numerals 27, 28, 29 and 30. The container comprises a concrete central dividing wall 33 which extends between the two opposed sidewalls 27 and 29 and thus forms first and second filtering chambers 37 and 38. The dividing wall 33 has first and second end portions 41 and 42, respectively, and an intermediate portion 43 located therebetween. The dividing wall 33 as seen in the view of FIG. 1 presents a generally L-shaped configuration which has a top edge on the high part of the L-shape and which has a top edge on the low part of the L-shape. In other words, the first end portion 41 and the intermediate portion 43 of the dividing wall has a top edge portion which is at a higher vertical level than the top edge portion of the second end portion 42.

These top edges of 41 and 43 have been identified by the reference numeral 46 and the top edge of 42 has been identified by the reference numeral 48.

A vertical opening 51 is cast into the dividing wall and extends through the intermediate portion 43 from the top edge 46 toward the bottom of the container 22 and at the bottom of the vertical opening 51 there are provided first and second lateral exit portions 58 and 59 from the opening which communicate with the bottom of the first and second filtering chambers 37 and 38, respectively. A liquid inlet 63 is provided in the container 22 and serves to connect the outlet of a home effluent plant 67 to the filter 20. First liquid conduit means 66 are provided on the top edge 46 of the first end portion 41 of the dividing wall 33 and as will be seen from the drawings this conduit means is in the shape of a trough or a U-shaped configuration and provides for the passage of fluid from the inlet 63 to the vertical opening 51. A notch 68 or cutout portion is provided in the conduit 66 for a purpose which will be described in more detail hereinafter. A cast concrete grating 69 is positioned in each of the first and second filtering chambers 37 and 38 and is best seen in FIGS. 4 and 5. Each of the gratings comprises a generally rectangularly-shaped member in plan view with planar sides and comprises a plurality of openings or slots 71 which extend therethrough which openings, as seen in the sectional view of FIG. 5, are generally tapered in their shape. Reinforcing material such as metal members are embedded in the grating 69 and in FIG. 4 the general alignment and positioning of the reinforcing in indicated by the dot-dash lines 165. These gratings at their peripheral edges rest upon a shoulder 70 which extends completely around each of the chambers 37 and 38. The concrete gratings 69 serve to divide each of the chambers 37 and 38 into a top portion 74 and a bottom portion 75. A layer of filtering material is positioned on the entire upper surface of each of the gratings 69 and the filtering media comprises smooth gravel 77 having a preferred diameter of from one-quarter inch to three-eighths inch.

A liquid outlet 83 is provided in the container 22 opposite the inlet 63 and at a lower vertical level than the inlet. Second liquid conduit means 81 are provided on the top edge 42 of the second end portion 42 to provide for the exit of filtered liquid from the top portion 74 of the chambers 37 and 38. The conduit 81 is shaped essentially as the conduit 66 and is generally channel-shaped or U-shaped in cross-sectional configuration and includes weirs 86 and 87. It will be noted that the container 22 and the dividing wall as well as the complete first and second liquid conduit means are cast as an integral one-piece reinforced concrete unit.

A cast concrete cover 90 serves to close the top of the container and an access riser 92 also comprising a one-piece cast concrete unit provides access to grade level and this riser is closed by a riser cover 94.

The operation of the filter is essentially as follows. Liquid leaving the home plant 67 enters the inlet 63 of the filter and travels in the conduit 66 to the opening 51 and enters the bottom portion 75 of each of the filtering chambers 37 and 38. From this position it travels up through the filtering media 77 where solids are filtered out and remain in the bottom portion 75 of the filtering chambers. As the liquid flows up through the concrete grating, bacteria attaches to the stones making the stones, in effect, a biological filter which then serves to filter out and adsorb smaller solids. The effluent from the home plant is maintained at a high level of dissolved oxygen in order to keep the filter 20 aerobic with carbon dioxide as the main by-product thereby resulting in few or no odors. The filtered liquid which passes to the top portion 74 of each of the filtering chambers then exits the filter by overflowing the weirs 86 and 87 into the conduit 81 and exit of the fluid from the filter is provided through outlet 83. A chlorination system can be provided in the conduit 81 if desired to properly and appropriately chlorinate the liquid leaving the filter.

It is necessary at appropriate intervals to clean the filter of the present invention and one of the advantages of the present invention is the ease with which this may be done and also the fact that the filter has a built-in cleaning indicator. As the filtering media begins to clog or become occluded with solids which have been removed from the liquid being filtered, a pressure head of liquid backs up the vertical opening 51. When a given head has developed in the filter as a result of clogging of the filtering media, the liquid in conduit 66 overflows the notch 68 traveling directly into the top portion 74 of the filtering chambers 37 and 38. This signals the necessity of cleaning the filter. As a matter of example only, this may occur under normal usage conditions at approximate six-month intervals.

In order to properly clean the filter, all that need be done is to remove the riser cover 94 as seen in FIG. 1 and insert a hose down through the vertical opening 51 into the bottom portion 75 of the filtering chambers 37 and 38. The filtered solids which have collected at this point are withdrawn and discharged back into the home plant where they are again treated. At the same time fresh water is passed vertically down through the filtering media from the top portion 74 so as to wash the solids from the filtering media which have collected through use.

FIG. 6 illustrates how the top of the filter is brought up to grade when for one reason or another it is located too far below grade level to simply use the riser 92 which is shown in FIG. 1. In this particular instance an extension riser 97 is located between the top of the container 22 in order to reach grade level properly. It will be quite apparent that if necessary a plurality of extension risers 97 might be utilized. FIG. 7 is quite similar to FIG. 6 in that an extension riser 97 is utilized; however, in this particular embodiment a grating cover 100 is utilized with a grating 101.

Figure 2:
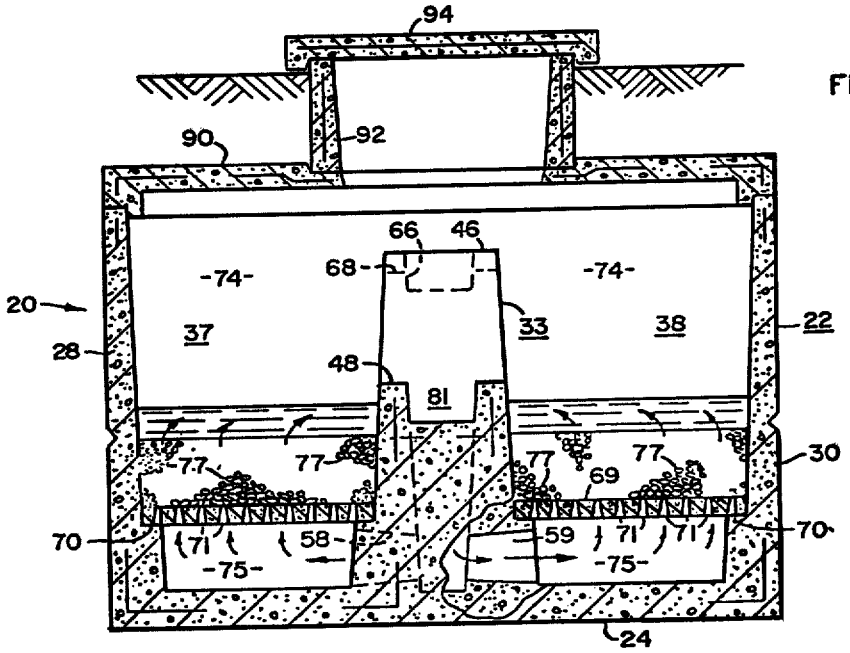
FIG. 2 is an end view of the filter shown in FIG. 1 and taken generally along the line 2—2 of FIG. 1.

FIGS. 8 and 9 illustrate a modification of the invention shown in FIGS. 1, 2 and 3. The same reference numerals have been used in the modified form of the invention where the structure is substantially the same as in FIGS. 1, 2 and 3 and new reference numerals have been used where the structure has been changed.

In this embodiment the major change is in the structure of the dividing wall which has here been identified by reference numeral 133. This wall results in a cut out or void 134 which permits passage of filtered liquid between the upper portions of filtering chambers 37 and 38. This change in structure results in a shortening of the conduit means 166 over that shown in FIG. 1 and a lengthening of the inlet 163 as shown. This change in structure, also, shortens the first end portion of the wall which is at the same level as inlet 163 so the first end portion is identified by numeral 141. The lower portion of the first end portion of the wall is, however, of the same length as in FIG. 1. The by-pass notch 168 has been shifted to a position in line with the vertical opening 51.

This modification is designed to function in essentially the same manner as that shown in FIGS. 1 through 3; however, it is capable of functioning even though the container or tank 22 is not set perfectly level in the ground. It is possible that the tank of FIG. 1 might be tipped to such a degree that the liquid level in chambers 37 or 38 might be lower than weirs 86 or 87 which results in liquid being filtered by only one-half of the tank. In the structure of FIGS. 8 and 9 both sides of the tank function at all times even if the tank is not installed level because filtered liquid can pass to either side of the tank through the cut out 134.

Although this invention has been described in its preferred form and preferred practice with a certain degree of particularity, it is understood that the present disclosure of the preferred form and preferred practice has been made only by way of example and that numerous changes in the details of construction and the combination and arrangement of parts and steps may be restored to without departing from the spirit and the scope of the invention as hereinafter claimed.

What is claimed is:

1. An upflow filter including in combination a generally rectangularly-shaped, cast, one-piece, concrete container having an open top, a bottom wall and four sidewalls, said container containing a concrete dividing wall integral with and extending between two opposed sidewalls of said container thereby forming first and second filtering chambers, said dividing wall having a first and a second end portion and an intermediate portion therebetween, said first end portion and said intermediate portion each having a top edge portion which is at a higher vertical level than a top edge portion of said second end portion, said dividing wall comprising generally an L-shape in side elevational view with said top edge of said first end portion and said intermediate portion being on the high part of the L-shape and the top edge of said second end portion being on the low part of the L-shape, a vertical opening cast into said intermediate portion of said dividing wall and extending through said intermediate portion from said top edge portion substantially to said bottom of said container and having first and second lateral exit portions that communicate with the bottom of said first and second filtering chambers, a liquid inlet, first conduit means extending along the top edge of said first end portion of said dividing wall from said liquid inlet to said vertical opening, a grating positioned in each of said first and second filtering chambers and dividing each into top and bottom portions, a filtering material on each of said gratings for filtering liquid passing between said bottom and top portions of each chamber, a liquid outlet, second conduit means integrally formed on the top edge of said second end portion of said dividing wall and defining a second passage connected to said liquid outlet, first and second weirs formed in said second conduit means to provide for the entrance of liquid from said first and second chambers into said second passage and thereafter out said liquid outlet, and a cover closing said open top of said container.

2. A filter as claimed in claim 1, wherein said second passage on said L-shape is generally trough-shaped in cross section.

3. A filter as claimed in claim 2, wherein said trough-shape of said second passage includes a flat bottom wall and first and second side walls which taper toward each other as they approach said flat bottom wall to which they are attached.

4. A filter as claimed in claim 3, wherein each of said gratings are of cast concrete and comprise a one-piece integral unit.

5. A filter as claimed in claim 4, wherein a one-piece cast concrete cover closes the open top of said container.

6. A filter apparatus as claimed in claim 4, wherein each of said gratings includes a plurality of elongated openings which are generally V-shaped in cross.

7. An upflow filter as claimed in claim 1, wherein said top edge portion of said first end portion of said dividing wall extends all the way to the sidewall of the container to which it is attached.

8. An upflow filter as claimed in claim 1, wherein said top edge portion of said first end portion of said dividing wall and a vertical extent of said dividing wall are spaced from the sidewall to which said first end portion of said dividing wall is attached producing a cut out portion to permit fluid flow between the top portions of said first and second filtering chambers.

*9. An upflow filter including in combination a generally rectangularly-shaped, cast, one-piece, concrete container, having an open top, a bottom wall, and four side walls, said container containing a concrete dividing wall integral with and extending between two opposed side walls of said container thereby forming first and second filtering chambers, said dividing wall having a first and a second end portion and an intermediate portion therebetween, said first end portion and said intermediate portion each having a top edge portion which is at a higher vertical level than a top edge portion of said second end portion, said dividing wall comprising generally an L-shape in side elevational view with said top edge of said first end portion and said intermediate portion being on the high part of the L-shape and the top edge of said second end portion being on the low part of the L-shape, a vertical opening cast into said dividing wall upstream from said second end portion and extending from said top edge portion substantially to said bottom of said container and having first and second lateral exit portions that communicate with the bottom of said first and second filtering chambers, a liquid inlet communicating with said vertical opening, a grating positioned in each of said first and second filtering chambers and dividing each into top and bottom portions, a filtering material on each of said gratings for filtering liquid passing between said bottom and top portions of each chamber, a liquid outlet, conduit means integrally formed on the top edge of said second end portion of said dividing wall and defining a passage connected to said liquid outlet, first and second weirs formed in said conduit means to provide for the entrance of liquid from said first and second chambers into said passage and thereafter out said liquid outlet, and a cover closing said open top of said container.*

* * * * *